(12) United States Patent
Leszczyna

(10) Patent No.: US 11,539,674 B2
(45) Date of Patent: Dec. 27, 2022

(54) METHOD AND SYSTEM FOR ANONYMOUS SENDING OF PHYSICAL ITEMS WITH POSSIBILITY OF RESPONDING

(71) Applicant: Rafal Marek Leszczyna, Gdansk (PL)

(72) Inventor: Rafal Marek Leszczyna, Gdansk (PL)

( * ) Notice: Subject to any disclaimer, the term of this patent is extended or adjusted under 35 U.S.C. 154(b) by 0 days.

(21) Appl. No.: 17/670,529

(22) Filed: Feb. 14, 2022

(65) Prior Publication Data

US 2022/0166758 A1    May 26, 2022

(51) Int. Cl.
*H04L 9/40*     (2022.01)
*H04L 51/42*    (2022.01)
*H04L 51/48*    (2022.01)
*H04L 51/212*   (2022.01)

(52) U.S. Cl.
CPC ........ *H04L 63/0421* (2013.01); *H04L 51/212* (2022.05); *H04L 51/42* (2022.05); *H04L 51/48* (2022.05)

(58) Field of Classification Search
CPC .............. G06F 21/606; G06F 21/6245; G06F 21/6254; H04L 29/06639; H04L 29/06646; H04L 29/06653; H04L 51/28; H04L 63/0407; H04L 63/0414; H04L 63/0421; H04L 63/1408
See application file for complete search history.

(56) References Cited

U.S. PATENT DOCUMENTS

| | | | |
|---|---|---|---|
| 5,627,517 A * | 5/1997 | Theimer | G01S 13/78 340/426.2 |
| 7,848,961 B2 | 12/2010 | Estes et al. | |
| 8,693,377 B1 * | 4/2014 | Hazy | H04M 7/003 379/88.16 |
| 9,032,037 B2 | 5/2015 | Huang et al. | |
| 9,071,579 B1 | 6/2015 | Bender | |
| 9,553,863 B2 | 1/2017 | Greenberg-Barak et al. | |
| 10,079,807 B2 | 9/2018 | Parikh et al. | |
| 11,057,354 B2 | 7/2021 | Leszczyna | |
| 2002/0138354 A1 * | 9/2002 | Seal | G06Q 30/06 705/50 |
| 2003/0046202 A1 * | 3/2003 | Knapp | G06Q 20/383 705/35 |
| 2005/0108037 A1 * | 5/2005 | Bhimani | G06Q 20/382 709/217 |
| 2008/0172305 A1 | 7/2008 | Estes et al. | |
| 2013/0311588 A1 * | 11/2013 | Huang | H04L 51/214 709/206 |

(Continued)

FOREIGN PATENT DOCUMENTS

WO    WO-2019081816 A1 *    5/2019    ....... G06Q 10/06313

OTHER PUBLICATIONS

R. AlTawy, M. ElSheikh, A. M. Youssef and G. Gong, "Lelantos: A Blockchain-Based Anonymous Physical Delivery System," 2017 15th Annual Conference on Privacy, Security and Trust (PST), 2017, pp. 15-1509 (Year: 2017).*

(Continued)

*Primary Examiner* — Theodore C Parsons

(57) ABSTRACT

The present invention relates to a method and a system that enable a sender to send one or more physical items to a recipient in an anonymous way, allowing the recipient to respond to the sender after receiving the one or more physical items. No data related to the sender and the recipient are retained in the system.

17 Claims, 2 Drawing Sheets

(56) References Cited

U.S. PATENT DOCUMENTS

| | | | |
|---|---|---|---|
| 2014/0316927 A1* | 10/2014 | Ganesan | G06Q 30/0611 |
| | | | 705/26.4 |
| 2015/0304300 A1 | 10/2015 | Bender | |
| 2016/0379214 A1* | 12/2016 | Li | G06K 7/1417 |
| | | | 705/64 |
| 2018/0232526 A1 | 8/2018 | Reid et al. | |
| 2018/0276674 A1* | 9/2018 | Ramatchandirane | G06Q 20/18 |
| 2019/0007377 A1 | 1/2019 | Bender | |
| 2020/0382455 A1 | 12/2020 | Fasoli et al. | |

OTHER PUBLICATIONS

Androulaki, E., Bellovin, S. (2009). APOD: Anonymous Physical Object Delivery. In: Goldberg, I., Atallah, M.J. (eds) Privacy Enhancing Technologies. PETS 2009. Lecture Notes in Computer Science, vol. 5672. Springer, Berlin, Heidelberg. (Year: 2009).*

Esma Aïmeur, Gilles Brassard and Flavien Serge Mani Onana, Secure Anonymous Physical Delivery, IADIS International Journal on WWW-Internet, vol. 4, No. 1, pp. 55-69 (2006) (Year: 2006).*

\* cited by examiner

METHOD AND SYSTEM FOR ANONYMOUS SENDING OF PHYSICAL ITEMS WITH POSSIBILITY OF RESPONDING

FIELD OF THE INVENTION

The present invention relates to the field of message, mail or parcel delivery, remote or online shopping as well as transportation of items and particularly to a method and a system that enable a sender to anonymously send one or more physical items to a recipient, allowing the recipient to respond to the sender after receiving the one or more physical items.

BACKGROUND OF THE INVENTION

There are multiple contexts in which a party wishes to send one or more physical items, such as a letter, a parcel or a batch of physical items to a particular recipient anonymously while retaining the opportunity of being responded.

For instance, a person may wish to anonymously send an inquiry or a signaling letter related to a sensitive situation by traditional mail, having the possibility of their communication being replied to by the recipient. As another example, a person may wish to anonymously send a parcel to a recipient and request feedback from the recipient. As yet another example, in the context of remote shopping, a person may wish to anonymously send a product order to a seller by postal mail and to be delivered the product in the response to the communication, without letting know the seller their physical address and other personal data. Also, a person might wish to remain anonymous during a distance exchange of physical items.

Existing approaches to provide anonymity when shipping physical items such as letters or parcels, either do not enable responding to the anonymous sender or require registration, provision of personal data (e.g. the sender's physical address), or some other data that could eventually lead to the identification of the sender. Often, they take advantage of conventional payment solutions, such as credit card payments. As such, the approaches are characterized by a reduced level of anonymity of the sender because at any time the link between the sender and the message or delivery can be retrieved.

SUMMARY OF THE INVENTION

The present invention relates to a method and a system that address the above disadvantages and other disadvantages not described above. In the invention, no data related to the sender and the recipient are retained in the system.

The subject matter claimed herein is not limited to embodiments that solve the above disadvantages or that operate only in environments such as those described above. Rather, this background is only provided to illustrate selected application areas where some embodiments described herein may be practiced.

BRIEF DESCRIPTION OF DRAWINGS

Embodiments of the disclosure may be better understood by referencing the accompanying drawings.

It should be understood that the present drawings are not necessarily to scale and that the embodiments disclosed herein are sometimes illustrated by fragmentary views. In certain instances, details which are not necessary for an understanding of the present invention or which render other details difficult to perceive may have been omitted. Instead, the emphasis is being placed upon illustrating the principles of the invention. It should also be understood that the invention is not necessarily limited to the particular embodiments illustrated herein. Like numbers utilized throughout the various figures designate like or similar parts or structure.

DETAILED DESCRIPTION OF THE INVENTION

In the following description, specific details of the present invention are provided. Various modifications to the disclosed embodiments will be readily apparent to those skilled in the art, and the general principles defined herein may be applied to other embodiments and applications without departing from the spirit and scope of the present invention. At the same time, well-known features have not been described in detail so as not to obscure the invention. Thus, the present invention is not intended to be limited to the embodiments presented but is to be accorded the widest scope consistent with the principles and features disclosed herein.

The invention relates to a method and a system that enable a sender to send a physical delivery to a recipient in an anonymous way, allowing the recipient to respond to the sender on the receipt of the delivery. The delivery may have a form of a letter, parcel, or another type of physical item or a batch of physical items.

Figure 1:
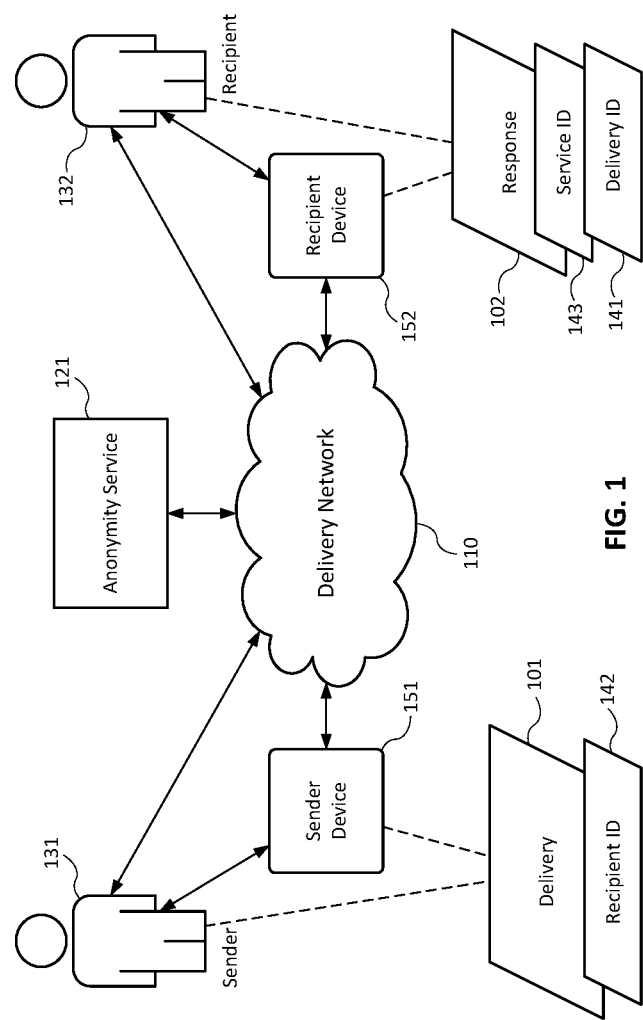
FIG. 1 is a block diagram depicting the components of the system of the invention according to one embodiment.

FIG. 1 illustrates an embodiment of the system of the invention. Both, the delivery 101 and the response 102 are sent via a delivery network 110. The delivery network may have an analog form. In such embodiment, the network can include any type of delivery channel or a logistic network capable of linking communicating parties and delivering items from one to another. This includes, but is not limited to, a postal network, a logistic network for mail or package delivery, or a combination of networks. The delivery network may also be a combination of one analog network or multiple analog networks and one electronic network or multiple analog electronic networks. In such embodiment, the electronic network can include any type of wired or wireless communication channel capable of linking computing nodes. This includes, but is not limited to, a local area network, a wide area network, or a combination of networks. In particular, the Internet may be utilized as the delivery network.

The anonymity service 121 receives deliveries from senders 131, processes them and sends them to recipients 132. As one embodiment, the service may be provided by human operators. In another embodiment, the service may be provided by human operators supported by a computer program or system executed on one or multiple computing nodes. The computer program or system may comprise one or more modules or blocks of machine-readable code. Each module may be configured to implement particular functionality when executed by one or more processors, and the various modules may work together to provide integrated overall functionality. In certain embodiments, the program or system may be implemented as hardware, i.e. a processor, a chip, or another type of electronic circuit, or in a hybrid form, that is employing software components and hardware components. The program or system may take the form of a website or a server application. As an embodiment of the invention, the use of the anonymity service may be enabled for a fee.

Processing of deliveries includes, but is not limited to, generating an ID of a delivery 141. For a defined time, the delivery ID needs to be unique or relatively unique, enabling differentiation of the delivery from other deliveries processed in the defined time. As an exemplary embodiment, a message digest computed on a description of the delivery combined with a timestamp can be utilized. As another embodiment, if the delivery is a written communication, such as a letter, a message digest computed on the content of the communication combined with a timestamp can be utilized. The computation can be performed by human operators or by a computer program, depending on the particular embodiment of the system of the invention. The anonymity service couples the delivery IDs with deliveries before sending them to recipients. Also, the anonymity service receives responses from recipients and stores them for a defined time or until they are presented or delivered to the (initial) sender 131. After that, the responses are removed from storage. The anonymity service enables the (initial) senders 131 to check if a response 102 to their delivery 101 has arrived. Upon successful verification, it delivers the response 102 to the (initial) sender 131.

Depending on a particular embodiment of the system, the response 102 may have a form of a message or another type of item. The message may be in the form of an electronic message such as a text message, an e-mail, a voicemail message etc., or an analog message, such as a handwritten letter. Other types of items that can form a response include, but are not limited to, postal packages, parcels or other physical consignments, electronic batches of data, including audio or video files, and other compound data structures. As an embodiment of the invention, the response can be delivered to a proximity of a sender address or a pickup point.

In addition to the above-described features, the anonymity service may include other features. As an example, it may support the preparation of deliveries for sending (e.g. packaging). As another example, it may examine a delivery with regard to its content comprising dangerous items or to recognise the nature of the shipment. All or a selection of the above-described features may be provided, at the request of a sender or a recipient.

In another embodiment, additional content may be incorporated into a delivery, such as a privacy statement, an informative message, or a trademark associated with the anonymity service. In a particular embodiment, the service may introduce payment options. Preferably, but not limited to, these payment options should be anonymous. For instance, a cash payment may be utilized. The service and the system may be provided to one or multiple senders and recipients, twenty-four hours a day, seven days a week, each day per year, or otherwise as desired. Also, the system may include multiple anonymity services. The system may operate world-wide without frontiers.

The sender may interact with the anonymity service directly or using a sender device 151. The sender device may be an electronic device, such as a computing device or an analog device (e.g. an analog fax machine). In one embodiment, the communication may be supported by a computer program executed on the sender device that provides additional auxiliary features. The computer program may, for example, cause the processor of the sender device to cause a display thereof to display a graphical user interface. The computer program may be also in the form of an "app" (or "application") or software application which the sender downloads and installs on their device (such as by storing in it the memory). Furthermore, the computer program may be provided as an extension to a separate computer program. For instance, it may have the form of an extension to an e-mail or messaging application. In a preferred embodiment, the sender may interact with the anonymity service via a network of anonymization nodes, such as ToR or I2P, or another type of anonymity system that increases untraceability.

For a delivery to be correctly delivered to the recipient, the ID of the recipient 142 needs to be coupled with the delivery. As an example, the physical address of the recipient may be utilized. To enable responses to the sender on the receipt of delivery, the anonymity service needs to generate a delivery ID 141 and couple it with the delivery.

Similarly, the recipient may interact with the anonymity service directly or using a recipient device 152. The recipient device may be an electronic device, such as a computing device or an analog device (e.g. an analog fax machine). In one embodiment, the communication may be supported by a computer program executed on the recipient device that provides additional auxiliary features. The computer program may, for example, cause the processor of the recipient device to cause a display thereof to display a graphical user interface. The computer program may be also in the form of an "app" (or "application") or software application which the recipient downloads and installs on their device (such as by storing in it the memory). Furthermore, the computer program may be provided as an extension to a separate computer program. For instance, it may have the form of an extension to an e-mail or messaging application. In a preferred embodiment, the recipient may interact with the anonymity service via a network of anonymization nodes, such as ToR or I2P, or another type of anonymity system that increases untraceability.

For a response 102, to be correctly delivered to the (initial) sender 131, the ID of the anonymity service 143 needs to be coupled with the response 102. As an example, when the response has the physical form, the physical address of the anonymity service may be utilized. As another example, for the response in the form of an e-mail, the ID of the anonymity service may be the e-mail address of the anonymity service. As yet another example, if phone-based electronic messaging is utilized for responding, the ID of the service may have the form of the anonymity service's phone number. Also, to assure correct delivery of the response the ID of the (original) delivery 141 needs to be coupled with the response.

Figure 2:
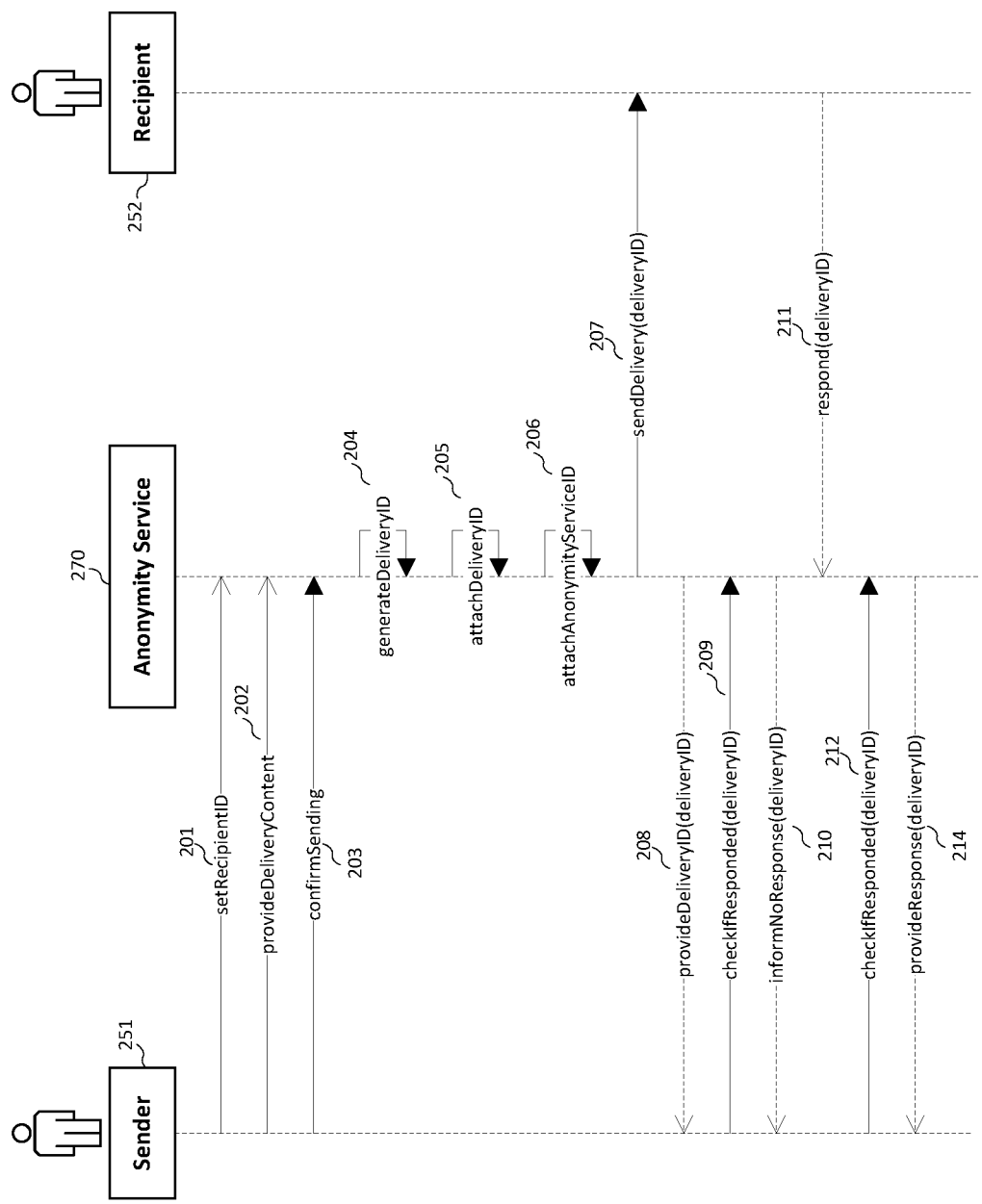
FIG. 2 illustrates an embodiment of the method of the invention.

FIG. 2 presents an embodiment of the method of the invention. In the embodiment, a sender 251 introduces, in any order, an ID of the recipient and provides the content of the delivery to be sent to the recipient 201, 202. In a preferred embodiment of the method, providing the ID of the recipient and the content of the delivery is sufficient for the delivery to be ready for sending. However, in alternative embodiments, also other data or items may be introduced into the delivery, including control data or attachments.

After confirming the sending of the delivery to the anonymity service 270 by the sender 203, the system generates an ID of the delivery 204 and attaches it to the delivery 205. To enable responding to the delivery, the ID of the anonymity service is provided as the sender ID 206. Then, the service sends the delivery to the recipient 207 and provides the delivery ID to the sender 208. After the delivery is sent, neither the ID of the recipient, nor the ID of the delivery, nor a description of the delivery are retained in the system.

On receipt of the delivery, the recipient 252 may respond to the (initial) sender 251 by sending a response 211. The response needs to contain the ID of the original delivery sent by the (initial) sender 251 and the ID of the anonymity service as the recipient ID of the response. At any time, the (initial) sender 251 may provide the anonymity service with the ID of the delivery that they sent to check if a response has arrived 209, 212. If the response has arrived to the service, it is provided to the sender 214. Otherwise, an informative message may be presented regarding the status (e.g. the absence) of the response 210. The response may be retained in the service for a defined time or it may be removed after being presented to the sender. The removal of the response may be performed after confirmation of the sender. As an embodiment of the invention, the response can be delivered to a proximity of a sender address or a pickup point.

Various modifications could be made to the exemplary embodiments, as described above concerning the corresponding illustrations. In particular combinations of the embodiments may be implemented, intercoupling the electronic and analog communication and delivery systems, as well as sending and receiving different types of messages and items. Thus, without departing from the scope of the invention, it is intended that all matter contained in the foregoing description and shown in the accompanying drawings shall be interpreted as illustrative rather than limiting. The breadth and scope of the present invention should not be limited by any of the above-described exemplary embodiments, but should be defined only in accordance with the following claims appended hereto and their equivalents. It will be understood that the above described arrangements of apparatus and the method there from are merely illustrative of applications of the principles of this invention and many other embodiments and modifications may be made without departing from the spirit and scope of the invention as defined in the claims.

What is claimed:

1. A method that enables a sender to send one or more physical items to a recipient in an anonymous way, allowing the recipient to respond to the sender after receiving the one or more physical items, the method comprising:
    obtaining, from the sender, in any order, an ID of the recipient and one or more physical items to be sent to the recipient by an anonymity service;
    obtaining by the anonymity service a confirmation of sending of the one or more physical items from the sender;
    generating an ID of the one or more physical items to be sent to the recipient;
    attaching the ID of the one or more physical items to the one or more physical items to be sent to the recipient;
    providing an anonymity service ID as the sender ID of the one or more physical items to be sent to the recipient;
    sending the one or more physical items to the recipient;
    receiving by the anonymity service a response from the recipient;
    storing the response for a defined time or until at least one predefined condition is satisfied, and then removing the response from storage;
    obtaining by the anonymity service a request from the sender for checking if a response with an ID of one or more physical items has arrived to the anonymity service; and
    providing the sender with a response with the ID of one or more physical items, or an informative message regarding the status of the response.

2. The method of claim 1, wherein the physical item is a physical message, wherein the ID of the message is generated as a message digest computed on the content of the message combined with a timestamp.

3. The method of claim 1, wherein the ID of one or more physical items is generated as a message digest computed on a description of the one or more physical items combined with a timestamp.

4. The method of claim 1, wherein the response is delivered to a proximity of a sender address.

5. The method of claim 1, wherein the response is delivered to a pickup point.

6. The method of claim 1 further comprising preparing one or more physical items for sending.

7. The method of claim 1 further comprising determining whether the one or more physical items include dangerous items.

8. The method of claim 1 further comprising examining the one or more physical items to recognise the nature of the one or more physical items sent by a sender.

9. The method of claim 1 further comprising incorporating additional content into the delivery, the additional content comprising a privacy statement or an informative message or a trademark associated with the anonymity service.

10. The method of claim 1 further comprising paying or anonymous paying for the anonymity service.

11. A system that comprises physical computing devices, that enables a sender to send one or more physical items to a recipient in an anonymous way, allowing the recipient to respond to the sender after receiving the one or more physical items, the system comprising at least one anonymity service comprising:
    obtaining, from the sender, in any order, an ID of the recipient and one or more physical items to be sent to the recipient by an anonymity service;
    obtaining by the anonymity service a confirmation of sending of the one or more physical items from the sender;
    generating an ID of the one or more physical items to be sent to the recipient;
    attaching the ID of the one or more physical items to the one or more physical items to be sent to the recipient;
    providing an anonymity service ID as the sender ID of the one or more physical items to be sent to the recipient;
    sending the one or more physical items to the recipient;
    receiving by the anonymity service a response from the recipient;
    storing the response for a defined time or until at least one predefined condition is satisfied, and then removing the response from storage;
    obtaining by the anonymity service a request from the sender for checking if a response with an ID of one or more physical items has arrived to the anonymity service; and
    providing the sender with a response with the ID of one or more physical items, or an informative message regarding the status of the response.

12. The system of claim 11 further comprising one or more sender devices or one or more recipient devices for interacting with the anonymity service.

13. The system of claim 12 further comprising a computer program on a recipient device or a sender device which enables:
    creating a message; or
    generating an ID of one or more physical items to be sent by a sender; or checking if a response with an ID of one or more physical items has arrived to the anonymity service; or displaying a response; or paying for the anonymity service.

14. The system of claim 11, wherein the use of the system is enabled for a fee.

15. The system of claim 11, wherein the anonymity service is adapted to eliminate or separate out user personal data from the data included in the one or more physical items sent by the sender or a response sent by a recipient.

16. The system of claim 11, wherein the anonymity service is adapted to determine whether the one or more physical items include dangerous items.

17. A non-transitory computer-readable medium storing a program causing a computer to execute a method that enables a sender to send one or more physical items to a recipient in an anonymous way, allowing the recipient to respond to the sender after receiving the one or more physical items, the method comprising:

obtaining, from the sender, in any order, an ID of the recipient and one or more physical items to be sent to the recipient by an anonymity service;

obtaining by the anonymity service a confirmation of sending of the one or more physical items from the sender;

generating an ID of the one or more physical items to be sent to the recipient;

attaching the ID of the one or more physical items to the one or more physical items to be sent to the recipient;

providing an anonymity service ID as the sender ID of the one or more physical items to be sent to the recipient;

sending the one or more physical items to the recipient;

receiving by the anonymity service a response from the recipient;

storing the response for a defined time or until at least one predefined condition is satisfied, and then removing the response from storage;

obtaining by the anonymity service a request from the sender for checking if a response with an ID of one or more physical items has arrived to the anonymity service; and providing the sender with a response with the ID of one or more physical items, or an informative message regarding the status of the response.

* * * * *